US012602685B2

(12) United States Patent
Rule et al.

(10) Patent No.: US 12,602,685 B2
(45) Date of Patent: Apr. 14, 2026

(54) SYSTEMS AND METHODS FOR TOKEN-BASED DEVICE BINDING DURING MERCHANT CHECKOUT

(71) Applicant: Capital One Services, LLC, McLean, VA (US)

(72) Inventors: Jeffrey Rule, Chevy Chase, MD (US); Jackson Macomber, Henrico, VA (US); Lawrence Douglas, McLean, VA (US); Bob Uni Koshy, Henrico, VA (US)

(73) Assignee: Capital One Services, LLC, McLean, VA (US)

( * ) Notice: Subject to any disclaimer, the term of this patent is extended or adjusted under 35 U.S.C. 154(b) by 75 days.

(21) Appl. No.: 17/712,853

(22) Filed: Apr. 4, 2022

(65) Prior Publication Data

US 2023/0316275 A1 Oct. 5, 2023

(51) Int. Cl.
G06Q 20/00 (2012.01)
G06Q 20/38 (2012.01)
G06Q 20/40 (2012.01)

(52) U.S. Cl.
CPC ....... *G06Q 20/401* (2013.01); *G06Q 20/3825* (2013.01); *G06Q 20/3827* (2013.01); *G06Q 20/386* (2020.05); *G06Q 2220/00* (2013.01)

(58) Field of Classification Search
None
See application file for complete search history.

(56) References Cited

U.S. PATENT DOCUMENTS 8,955,068 B1 * 2/2015 Venkataramani ....... H04L 63/08
713/182
9,589,262 B2 3/2017 Graylin et al.
10,152,705 B2 12/2018 Griffin et al.
11,195,177 B1 * 12/2021 Vijayvergia ......... G06Q 20/401
(Continued)

OTHER PUBLICATIONS

Grosse; Authentication_at_Scale; IEEE; pp. 15-22; 2013.*
(Continued)

*Primary Examiner* — Radu Andrei
(74) *Attorney, Agent, or Firm* — Sterne, Kessler, Goldstein & Fox P.L.L.C.

(57) ABSTRACT

Systems and methods are disclosed herein for real-time digital authentication. According to some embodiments, receiving a hashed user credential from the third party entity, performing a matching operation between the received hashed user credential and a stored hashed credential stored in the non-transitory memory, the received hashed user credential and the stored hashed credential being hashed using the same hashing algorithm, and in response to detecting a match between the received hashed user credential and the stored hashed user credential, performing a user eligibility operation associated with the first transaction. The authentication method may further include in response to determining that the user is eligible for the first transaction, generating an authentication challenge to the user, in response to the user successfully completing the authentication challenge, retrieving payment credentials of the user and authenticating the user, and authorizing a checkout operation associated with the first transaction.

20 Claims, 6 Drawing Sheets

(56) References Cited

U.S. PATENT DOCUMENTS

| | | | |
|---|---|---|---|
| 2005/0119978 A1 | 6/2005 | Ates | |
| 2007/0289000 A1 | 12/2007 | Weiss | |
| 2009/0157557 A1* | 6/2009 | Hobson | G06Q 20/3825 |
| | | | 705/67 |
| 2013/0198077 A1 | 8/2013 | Carlson et al. | |
| 2013/0238116 A1* | 9/2013 | Smith | G07F 9/001 |
| | | | 700/217 |
| 2015/0339662 A1 | 11/2015 | Huang et al. | |
| 2015/0373000 A1* | 12/2015 | Park | H04L 67/104 |
| | | | 726/7 |
| 2017/0142090 A1 | 5/2017 | Mahaffey et al. | |
| 2017/0221052 A1* | 8/2017 | Sheng | H04L 9/14 |
| 2017/0286958 A1 | 10/2017 | Herman | |
| 2018/0218168 A1* | 8/2018 | Goel | G06F 21/6245 |
| 2019/0073671 A1* | 3/2019 | Fang | G06Q 20/40 |
| 2020/0358755 A1* | 11/2020 | Abdul | H04L 67/55 |
| 2021/0006418 A1* | 1/2021 | Wei | H04L 9/3247 |
| 2021/0110474 A1* | 4/2021 | Morrow | G06Q 20/381 |
| 2022/0153211 A1* | 5/2022 | Maktin | E03D 5/01 |
| 2022/0300962 A1* | 9/2022 | Zia | H04L 9/0825 |
| 2023/0124498 A1* | 4/2023 | Agrawal | G06F 21/57 |
| | | | 713/194 |

OTHER PUBLICATIONS

Sabouri; A_Cloud-Based_Model_to_Facilitate_Mobility_of_
Privacy; IEEE; pp. 958-965; 2015.*
International Search Report and Written Opinion directed to related
application No. PCT/US2023/017318, mailed Jun. 23, 2023, 7
pages.

* cited by examiner

300

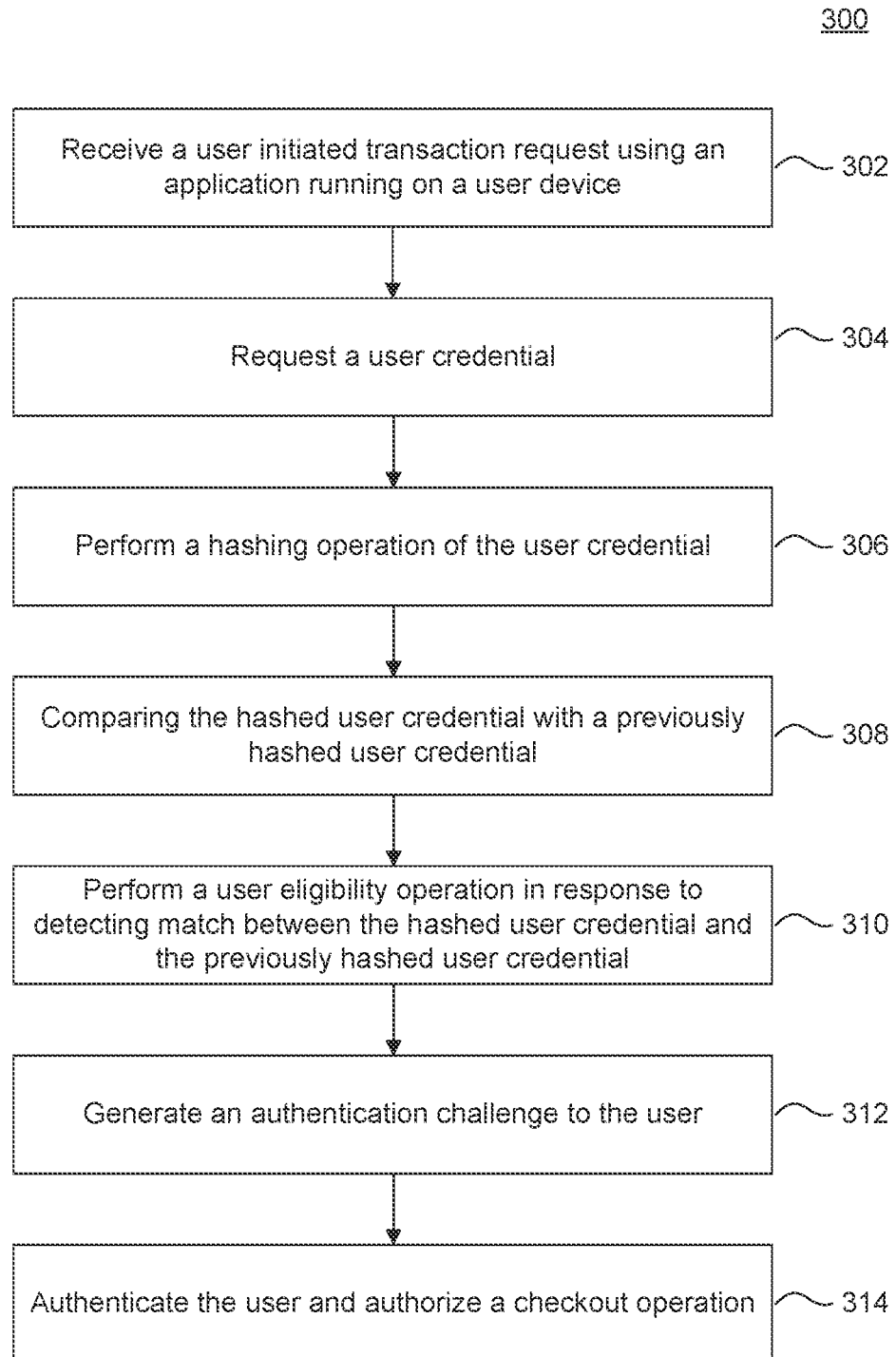

Receive a user initiated transaction request using an application running on a user device    ⌒ 302

Request a user credential    ⌒ 304

Perform a hashing operation of the user credential    ⌒ 306

Comparing the hashed user credential with a previously hashed user credential    ⌒ 308

Perform a user eligibility operation in response to detecting match between the hashed user credential and the previously hashed user credential    ⌒ 310

Generate an authentication challenge to the user    ⌒ 312

Authenticate the user and authorize a checkout operation    ⌒ 314

FIG. 3

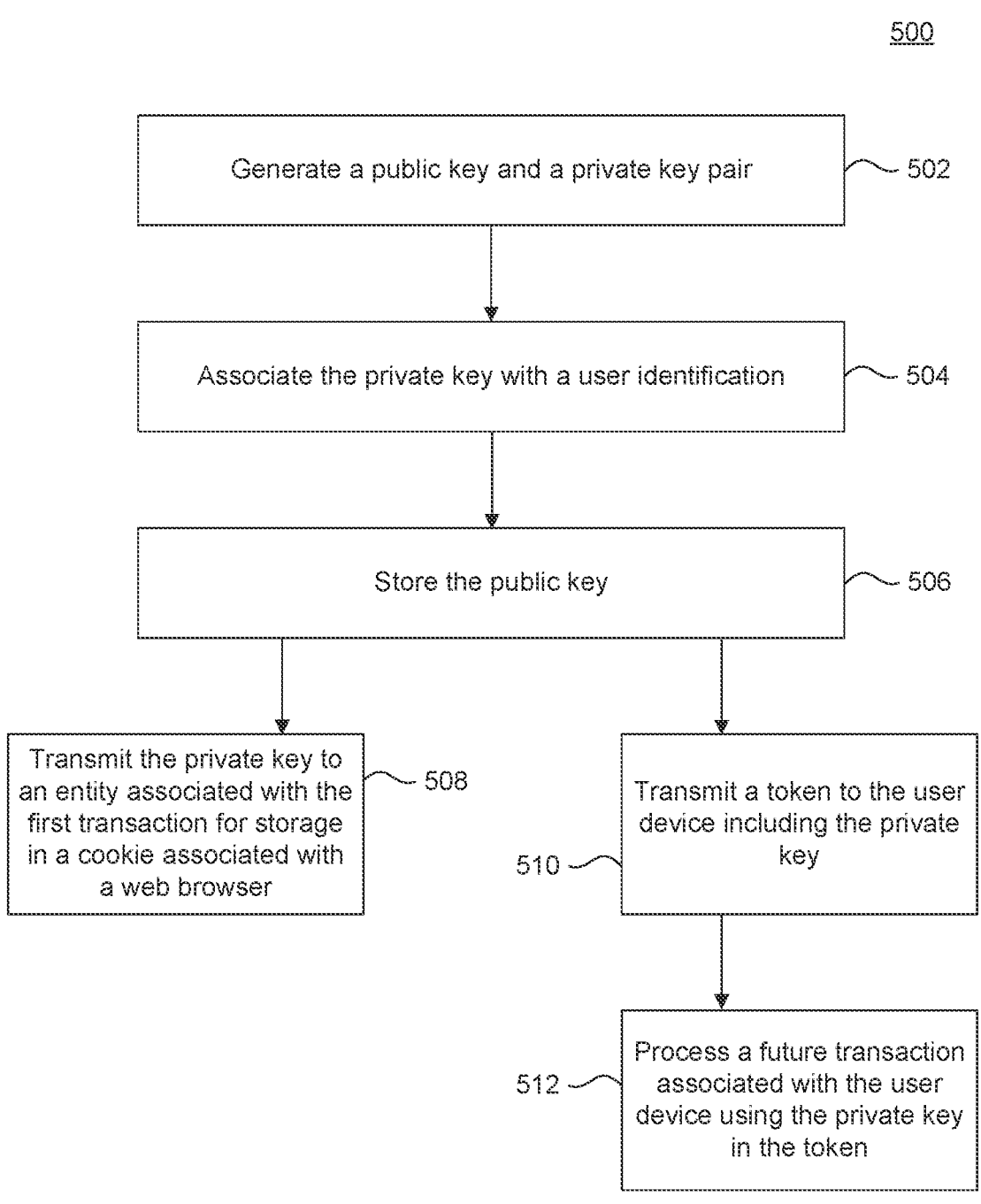

500

Generate a public key and a private key pair ~ 502

Associate the private key with a user identification ~ 504

Store the public key ~ 506

Transmit the private key to an entity associated with the first transaction for storage in a cookie associated with a web browser ~ 508

Transmit a token to the user device including the private key 510 ~

Process a future transaction associated with the user device using the private key in the token 512 ~

FIG. 5

SYSTEMS AND METHODS FOR TOKEN-BASED DEVICE BINDING DURING MERCHANT CHECKOUT

TECHNICAL FIELD

The present disclosure relates generally to electronic transactions conducted over a network using a mobile or other consumer electronic devices and, more particularly, to providing a secure authentication and device binding mechanisms that provide user convenience through avoiding initial and repetitive logging in when changing apps, devices, or moving from website to website.

BACKGROUND

Electronic commerce generally refers to the buying and selling of products or services over electronic networks such as the Internet and other computer networks using electronic devices such as mobile phones with mobile web browsers, smart phones, and electronic note pads. The huge volume of electronic commerce has given rise to a need for the ability to make secure transactions, such as payments for purchases, over the network. There are several service providers that facilitate electronic commerce by providing services to make payments and perform other transactions with security. For example, one service provider describes itself as acting like a digital wallet where the customer can securely store the customer's payment options—such as the customer's bank account and credit card—so that when the customer wants to make a payment, the customer doesn't have to pull out his or her credit card or type his or her billing information every time. This service provider provides a service that can be invoked from a participating merchant's website, for example, by simply clicking on the service provider's checkout button at the merchant website, which redirects the customer to a login page of the service provider where the customer can securely log in to his or her service provider account and select his or her preferred payment method. Then, for example, payment is made to the merchant by the service provider, and the customer is redirected back to the merchant website where the customer may confirm his or her purchase.

However, such transactions require a user to have initially created an account with a service provider, such that a log in operation with the service provider would enable the service provider to look up user financial information originally input by the user.

BRIEF DESCRIPTION OF THE DRAWINGS

FIG. 3 is a process flow diagram illustrating a method for authenticated payments using account binding techniques, according to some embodiments.

FIG. 5 is a process flow diagram illustrating a method for binding operations, according to some embodiments.

DETAILED DESCRIPTION

Figure 1:
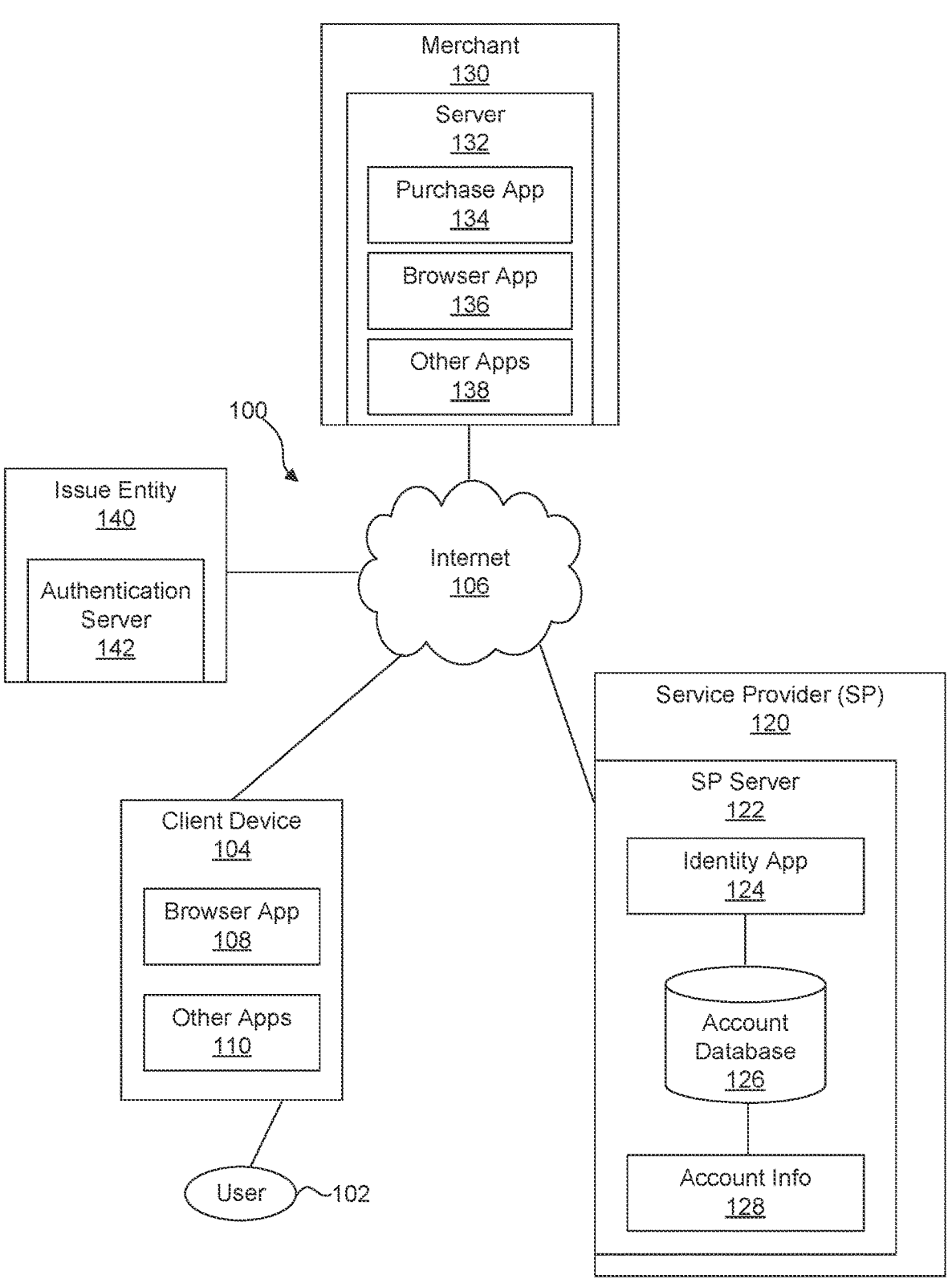
FIG. 1 is a block diagram of a distributed computer network incorporating a specific embodiment of a system for payment processing, according to some embodiments.

Examples of applications for the below methods, media, and systems are numerous, but a few are given here merely to indicate possible uses. Other applications will be readily apparent to one of skill in the relevant arts and are likewise contemplated by this disclosure. Moreover, description of "an embodiment" or "one embodiment" should not be construed as limiting the scope of the disclosure, as elements, sub-elements and features of a given embodiment may also be used in other embodiments of the disclosure. While methods described herein may have steps described in a specified order, it will be understood that some of those steps may be re-arranged or performed in a different order. Additionally, embodiments may be given describing applications to particular industries or commercial fields, but scope of the disclosure is not so limited.

Descriptions are given with reference to the figures included herein. When possible and for clarity, reference numbers are kept consistent from figure to figure. Some of the figures are simplified diagrams, which are not to be interpreted as drawn to scale or spatially limiting for the described embodiments. Where appropriate, the particular perspective or orientation of a figure will be given to increase understanding of the depicted features.

Reference will now be made in detail to exemplary embodiments of the disclosed technology, examples of which are illustrated in the accompanying drawings and disclosed herein. Wherever convenient, the same references numbers will be used throughout the drawings to refer to the same or like parts.

Aspects of the present disclosure provide for expedited authentication and checkout operations. According to some aspects, expedited authentication processes are described where users may be authenticated using only a single identification credential (without inputting any financial information with a merchant or a payment processor entity). Such authentication processes, in turn, expedite pending checkout operations by limiting user input at a checkout stage of a transaction. Moreover, aspects of the present disclosure incorporate binding techniques (browser, device, and multi-device) that expedite future checkout operations without the need to re-authenticate a user and/or customer.

According to some aspects, during a checkout operation on a merchant's app or website, a customer may need to be authenticated. According to some aspects, the customer may be authenticated by requesting and processing a single unique identifier associated with the customer (e.g., personal identification information (PII) like email address, phone number, address, device idea, Social Security Number, driver's license number, or the like). Alternatively, a biometric data (e.g., fingerprint, iris, face, or other body measurements or calculations related to human characteristics) could also be used assuming the issuer entity also has access to this biometric data. Upon receiving the PII at an issuer entity, a lookup operation may be performed to match the customer provided PII to the issuer's records (e.g., a bank account). When a match is detected, an issuer may provide an authorization for the pending checkout transaction to a merchant or a payment service provider (e.g., a processor entity). It can be appreciated that the processes described herein above may include additional steps as will be further described herein below.

FIG. 1 illustrates a system 100, in accordance with one or more aspects, for making a payment (or other financial transaction needing security) with a binding technique by a user 102 using a client device 104 (also referred to as "user device") to communicate over a network 106 (e.g., the Internet) to a commercial entity (e.g., merchant 130) using a service provider 120 and an issuer entity 140. The service provider 120 may be a payment provider or other provider of financial services, such as PayPal, Inc. of San Jose, Calif. The issuer entity 140 may be a banking institution where user 102 may hold an account and/or have a stored card-on-file. Network 106 may be implemented as a single network or a combination of multiple networks. For example, in various embodiments, network 106 may include one or more intranets, landline networks, wireless networks, or other appropriate types of communication networks including the Internet. In another example, the network may comprise a wireless telecommunications network (e.g., cellular phone network) adapted to communicate with other communication networks such as the Internet.

Client device 104 may be, for example, a mobile device (e.g., a laptop, smart phone, iPad® from Apple) or any other communication device (e.g., television with internet connection, set-top box or other network-connected devices). Client device 104, which may function as a client (and may also be referred to as "client device" 104), may be implemented using any appropriate combination of hardware and software configured for wired or wireless communication over network 106.

As seen in FIG. 1, a browser app 108 may run on client device 104 and may be used to provide a user interface to permit user 102 to browse information available over network 106. For example, browser app 108 may be implemented as a web browser to view information available over network 106. In one implementation, browser app 108 may comprise a software program such as a graphical user interface (GUI) executable by a processor that is configured to interface and communicate with merchant 130, service provider 120, and issuer entity 140 via network 106. For example, user 102 may access merchant websites via merchant 130 to find and purchase items. User 102, through client device 104, may also communicate with service provider server 122 to create an account and make a payment to the merchant 130 via service provider 120. Although, disclosed aspects of the disclosure reduce the need for a user to create accounts with service providers that would then need to be authenticated.

According to some aspects, at a check-out operation where user 102 may be a first time user (e.g., customer of a merchant), user 102 may only be prompted to provide certain personal information that would then enable the user, web browser, and/or client device 104 to be authenticated for a current transaction and also future transactions through binding techniques described herein. Information needed for authentication of the user may be limited to a single personal identification information (PII) without resorting to any type of login requirement. In other words, the disclosed embodiments herein enable a user authentication using a single PII of the user such as the user's email or phone number or the like without requiring a user input of financial information at any merchant or a payment processing entity (e.g., service provider 120).

According to some aspects, client device 104 may include other apps 110 as may be desired to make additional features available to user 102, including making quick payments with service provider server 122. For example, apps 110 may include interfaces and communication protocols that allow the user 102 to receive and transmit information through online sites via network 106. Apps 110 may also include security applications for implementing client-side security features, programmatic client applications for interfacing with appropriate application programming interfaces (APIs) over network 106 and various other types of generally known programs and applications.

Merchant 130 may be a service provider (for example, a merchant site, an auction site, a marketplace, or a social networking site including P2P money transfer or any other P2P-like information transfer) offering various items such as products or services through their website. Merchant 130 may process online transactions from consumers making purchases through the merchant site from client devices. Merchant 130 also may operate a merchant server 132 capable of handling various on-line transactions automatically, for example, by communicating over network 106 with client device 104, service provider server 122, and authentication server 142. Merchant server 132 may run a purchase app 134 for offering products or services for purchase. Merchant server 132 may also run a browser app 136 and other applications 138. Browser app 136 and other applications 138 may enable the merchant to access a service provider 120 web site and communicate with service provider server 122 and/or authentication server 142; for example, to convey and receive information to allow a quick payment through the service provider 120 and/or authentication server 142. In accordance with one or more embodiments, consumers (e.g., user 102) may access apps for making transactions (e.g., payments) with a merchant 130 through a service provider 120) without having to log in, which may enable quicker service (e.g., completing payment processing) with service provider server 132. This service is made simpler by not requiring a user to enter any type of financial information with either merchant 130 or service provider 120.

According to some aspects, service provider 120 may be an online payments provider, for example, providing processing for online financial and information transactions with a merchant 130 on behalf of a user 102 and issuer entity 140. Service provider server 122 may include one or more identity apps 124, which may be adapted to interact with the client device 104 as well as merchant server 132 and authentication server 142 over network 106 to facilitate the purchase of items, products, and services by user 102. Service provider server 122 may be configured to maintain multiple user and merchant accounts in an account database 126; each merchant account may include or be separate from account information 128 associated with individual users, including user 102 and one or more merchants 130. For example, account information 128 may include identity information of user 102 and merchants 130, such as one or more full names, business names, street addresses, email addresses and phone numbers, website addresses, or other types of financial information, which may be used to facilitate online transactions between user 102 and merchants 130. Account information 128 or identity app 124 may also include device identifiers (e.g., unique device identifier present on the device such as IMEI number) for user devices such as client device 104. Thus, identity app 124 may be configured to interact with a merchant server 132, a user 102, client device 104, or other payee to process, obtain, and store information for allowing quick payments.

Aspects of the present disclosure enable a payment processor entity (e.g., service provider 120) and/or a merchant (e.g., merchant 130) to receive financial information of a user at a checkout stage based on an authentication process performed by a bank (e.g., issuer entity 140). Such authentication process may be performed without requiring user 102 to input such information at any stage (e.g., without establishing an account and/or inputting financial information into an account associated with service provider 120). Accordingly, the disclosed authentication processing enables the issuer entity 140 to authenticate user 102 and transmit his/her credentials, including financial and account information, to service provider 120 and/or merchant 130 upon successful authentication of user 102. Alternatively, the present disclosure can also be used to create an account at a merchant 130 that can be used later if the user desires to make a purchase from a different device.

According to some aspects, issuer entity 140 may be a bank or any other type of institution in which a user may have an account. Issuer entity 140 may include an authentication server 142 that authenticates a user identity and authorizes service provider 120 to process a transaction on behalf of user 102. Authentication server 142 may also include one or more identity apps, which may be adapted to interact with the client device 104 as well as merchant server 132 and service provider server 122 over network 106 to facilitate the purchase of items, products, and services by user 102. Authentication server 142 may be configured to maintain multiple user and merchant accounts in an account database (not shown); each merchant account may include or be separate from account information associated with individual users, including user 102 and one or more merchants 130. For example, account information may include identity information of user 102 and merchants 130, such as one or more full names, business names, street addresses, email addresses and phone numbers, website addresses, or other types of financial information, which may be used to facilitate online transactions between user 102 and merchants 130. The account information or the identity app may also include device identifiers (e.g., unique device identifier present on the device, as described above, such as IMEI number) for user devices such as client device 104. Thus, identity app may be configured to interact with merchant server 132, user 102, client device 104, service provider server 122, or other payee to process, obtain, and store information for allowing quick payments.

As noted herein, according to some embodiments, the present disclosure reduces the need for a user to enter financial account information at any point before or during a transaction with either merchant 130 or service provider 120. For example, it can be appreciated that the disclosed methodologies described herein enable a service provider 120 to process a transaction on behalf of user 102, without requiring user 102 to have an established account and/or user profile with service provider 120. It can also be appreciated that service provider 120 may establish an account or profile (e.g., in the case where an account does not initially exist) for user 102 after authentication processing is complete. Once more, the disclosed methodologies reduce the need for user 102 to perform a logging in operation (e.g., using user name and password) with service provider 120 when attempting to check out.

Figure 2:
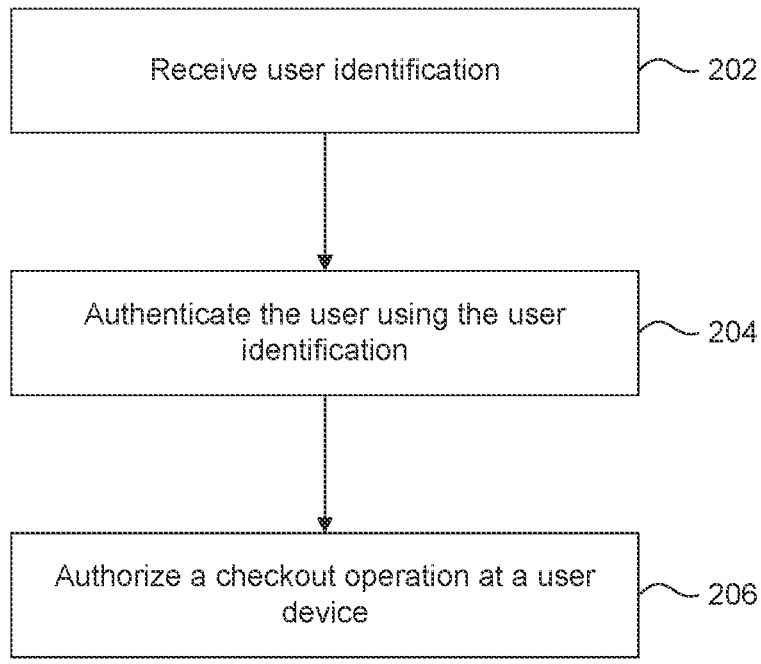
FIG. 2 is a process flow diagram illustrating a method for authenticated payments, according to some embodiments.
Figure 4:
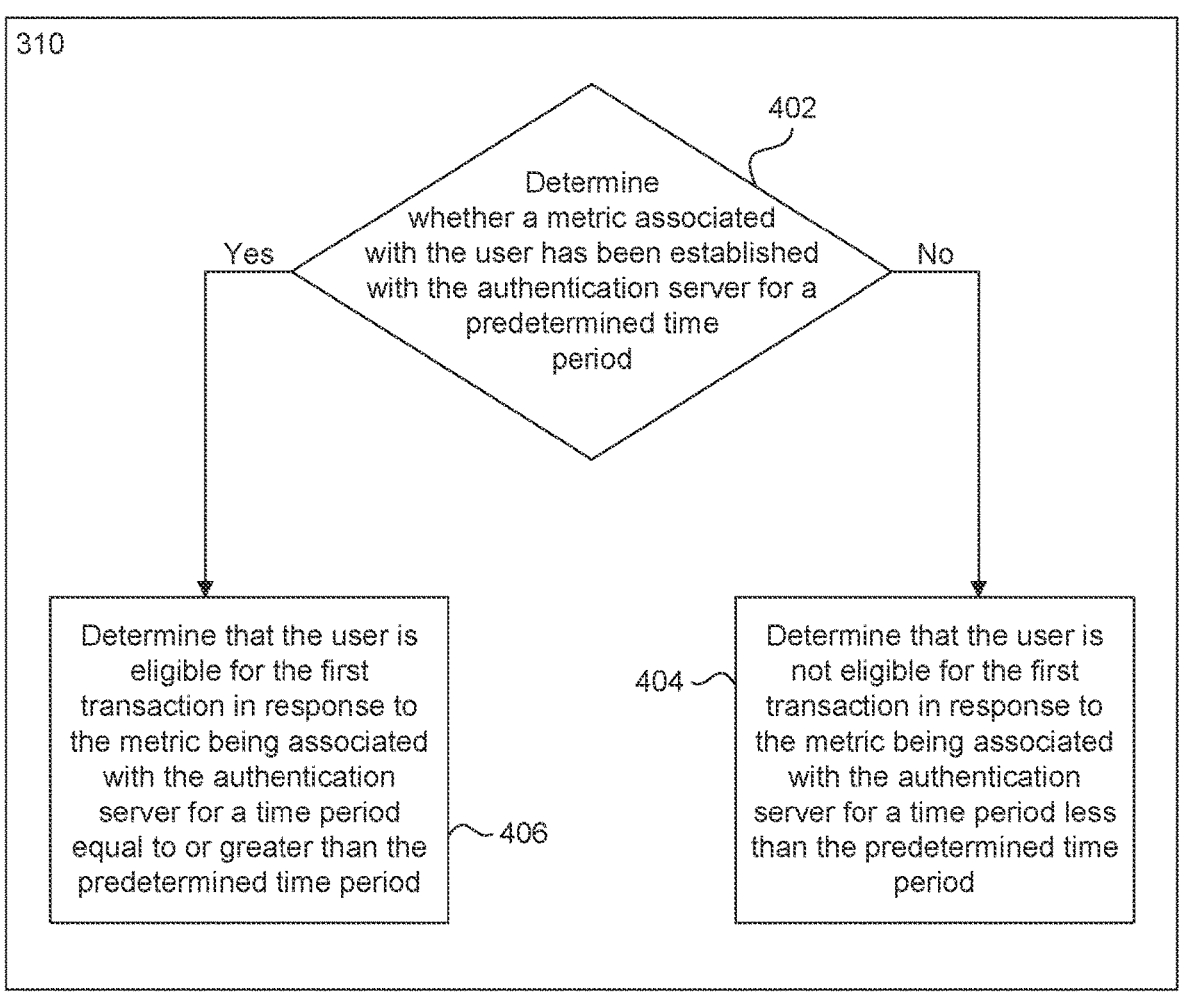
FIG. 4 is a process flow diagram illustrating a method for authenticated payments using account binding techniques, according to some embodiments.

As discussed herein with regard to FIGS. 2-4, the disclosed methodologies enable faster transactions, added security through authentication, improved accuracy of user financial credentials, and seamless binding operations to user browser and/or device for future processing. For example, a user leveraging the ability for a service provider to provide payment to a merchant during a transaction would have needed to create an account with the service provider and provided the service provider with financial information such as an account number associated with issuer entity 140. Such requirement may be reduced by the authentication and processing techniques described herein with regard to FIGS. 2-4. In other words, aspects of the present disclosure enable the provisioning of a card on file by relying on operations that leverage only user identification information and authentication procedures, without resorting to an input of any financial information (e.g., at the merchant or the service provider).

According to some embodiments, FIG. 2 presents a high-level process flow overview diagram illustrating a method 200 for authenticated payments using account binding techniques, according to some embodiments. According to some aspects, the method described herein may be applicable at a checkout operation (e.g., a first time check out operation with a merchant, or a checkout operation where a merchant does not have or has not maintained user identification or financial information, and/or any other transaction that will be apparent to those skilled in the art without departing from the spirit and scope of the disclosure). According to some aspects, the present disclosure may enable the provisioning of a credit card or financial information onto a merchant system (e.g., merchant server 132) in one single authentication step. This reduces transaction time where a user may be required to input financial information (for a first time or subsequent times) with a new merchant for example. According to some aspects of the disclosure, transactions enabled herein may be merchant agnostic. For example, after a user is authenticated, a binding operation may take place where the user information may be bound to a web browser and/or a user device (e.g., client device 104). In this regard, even if the user is transacting at a new merchant website, the user information is bound to the browser or device and enables the user to perform the check out operation.

According to some aspects, when user 102 is checking out at merchant 130, authentication server 142 may receive user identification at step 202. According to some aspects, when a user is ready to check out, merchant server 132 may prompt a user to enter personal identification information (PII) within purchase app 134, browser app 136 or any other platform as would be understood by those skilled in the art. Upon receiving the PII, the PII may then be processed and, at step 204, an authentication process may be performed by authentication server 142. If the user is authenticated, at step 206, authentication server 142 may transmit financial credential information to either merchant 130 or service provider 130 for payment processing.

FIG. 3 is a process flow diagram illustrating a method 300 for authenticated payments using account binding techniques, according to some embodiments. According to some aspects, method 300 may include receiving a user initiated transaction request using an application running on a user device, as illustrated in step 302. According to some aspects, as discussed herein above, user 102 may interact with merchant 130 through a web browser for example. The merchant web browser or a merchant app may be supported or provided by browser app 136. When user 102 is ready to check, the user may initiate a request to check out by selecting a check out option.

According to some aspects, method 300 may further include requesting a user credential, as illustrated in step 304. The user credential may be any type of PII, including, but not limited to, a user email address, phone number, driver's license, and/or any other identifying information. According to some aspects, the request for a user credential may be a request for a single credential. According to some aspects, when user 102 initiates the checkout operation, browser app 136, in collaboration with purchase app 134 and/or service provider server 122 may prompt the user to input the user credential.

According to some aspects, method 300 may further include performing a hashing operation of the user credential, as illustrated in step 306. A hashing operation may be the process of transforming any string of characters into another value. Hashing techniques may be implemented as a way to encrypt the PII. According to some aspects, the hashing operation may be performed by service provider 120. At this point, service provider 120 and/or merchant 130 may not have access to user 102's financial information and may not know which issuing entity is affiliated with the user 120. As such, service provider 120 and/or merchant may initiate a query to one or more issuer entities to request a comparison between the hashed PII and PII information stored at the one or more issuer entities. For example, issuer entity 140 may receive a query from service provider 120 requesting to determine whether the hashed PII corresponds to an account on file with the issuer entity. According to some aspects, service provider 120 and/or merchant may issue a request for one or more issuer entities to review the hashed PII and respond to service provider 120 or merchant 130 if the hashed PII matches an account on file. This may be performed through a request for proposal (RFP) platform where the query is sent to all issuer entities known to service provider 120. For a more expedited matching operation, service provider 120 may transmit the RFP to likely candidate issuer entities 140 (e.g., top 20 most common banks) and determining whether to expand the pool issue entities 140 based on received match responses. For example, if service provider 120 and/or merchant receives one or more matches from the initial query, it may not need to send the RFP to all known issuer entities 140. Alternatively, if service provider 120 and/or merchant 130 does not receive any matches from the initial query, then it may send the RFP to all known issuer entities 140. It can be appreciated that in cases where one or more issuer entities respond to the query with a match, service provider 120 may present user 102 with an option to select an issuer entity, or service provider 120 may select an issuer entity based on a predetermined metric (e.g., response time to the RFP or the like). Ultimately, if no issue entities 140 respond the user will be prompted to enter another form of payment.

Upon receiving the request to compare the hashed PII, authentication server 142 may compare the hashed user credential with a previously hashed user credential stored within authentication server 142, as illustrated in step 308. According to some aspects, in order for a matching operation to be valid, the hashed PII may be hashed in the same manner/technique as the previously hashed credential stored at authentication server 142. According to some aspects, authentication server 142 and service provider 120 (through service provider server 122) may use the same hashing techniques or algorithms to ensure that the matching operation is valid. It can be appreciated by those skilled in the art that any one of a plurality of hashing techniques may be used, as long as the hashing technique used by service provider server 122 is the same as the hashing technique or algorithm used by authentication server 142. The hashing of the PII also secures the user credential from being known by all issue entities.

According to some aspects of method 300, upon detecting a match between the hashed PII and a previously stored hashed credential, authentication server 142 may perform a user eligibility operation, as illustrated in step 310. In one example, authentication server 142 may determine eligibility based on other metadata associated with user 102. For example, authentication server 142 may determine eligibility based on account age, user 102 history, phone number on file (and duration of phone number on file), and/or any other information, including, for example, credit report/history and the like. It can be appreciated that user 102 may need to have an established track record with issuer entity 140 prior to leveraging this type of express check out operation. For example, a user whose account may be one hour old, may not be qualified to be authenticated pending further transactional history accumulation of the user and the user's profile. For example, authentication server 142 may determine whether a metric associated with the user (e.g., phone number) has been established with the authentication server for a predetermined time period (e.g., 14 days, 30 days, etc.).

According to some aspects, if authentication server 142 determines that the metric has been established with the authentication server for a period of time equal to or greater than the predetermined time period (e.g., phone number stored for over three months), authentication server 142 may determine that the user is eligible for the transaction and continues with the authentication processing. Further, the determination may be based on the metric being greater than the predetermined threshold. Moreover, in the event that authentication server 142 determines that the metric being associated with the authentication server for a time period less than the predetermined time period (e.g., two days), authentication server may transmit a message to the to client device 104 and/or service provider server 120 indicating that user 102 is not eligible for the transaction. Alternatively, the authentication server may check an additional one more metrics to determine that the metric has been established with the authentication server for a period of time equal to or greater than the predetermined time period.

According to some aspects, method 300 may further include generating an authentication challenge to the user, as is illustrated in step 312. The authentication challenge may be a one-time code sent with an SMS text (SMS-OTP) to client device 104. According to some aspects, authentication server 142 may look up the phone number associated with user 102 stored within authentication server 142 and transmit the SMS-OTP to client device 104. According to some aspects, if user 102 is operating on a mobile app, an app notification challenge may also be issued. It can be appreciated that other challenges may also be issued by authentication server 142 to user 102, including, but not limited to, email challenges and app-to-app challenges. The user is authenticated and authorized for checkout once the user passes, for example, the authentication challenge as shown in step 314. However, it is not required that every step in FIG. 3 be performed prior to authorizing a checkout operation. Further, once authenticated, a merchant 130 or service provider 120 may create an account associated with the user.

According to some aspects, when user 102 successfully completes the challenge (step 312), the user is determined to be authenticated and authentication server 142 may then transmit financial payment credential information (e.g., bank account, credit card number, PayPal account, etc.) on behalf of the user for populating or storing at merchant 130 and/or service provider 120 to complete the checkout operation as well as for future transactions. The user may also be provided an opportunity at this time to authorize the merchant to use the payment credential information or alternatively use another form of payment.

According to some aspects, authentication server may also issue additional information associated with the user to be stored within service provider server 122 or merchant 130, for example. Such information may relate to populating a user profile, including user phone number, home address, email, and the like, as would be maintained in the ordinary course of business by issuer entity 140 According to some aspects, authentication server 142 may also provide virtual card number (VCN) information of user 102 to service provider server 122 or merchant 130 for storage as a card on file for future card not present (CNP) transaction. In doing so, authentication server 142 may authorize the checkout operation associated with the future transaction.

FIG. 4 is a process flow diagram illustrating a method 400 for performing the user eligibility operation 310 of FIG. 3, according to some embodiments. Prior to authenticating a matched user, an issuer entity may need to determine if the user is eligible. Eligibility may relate to age of the user's account with the issuer entity, amount of funds available for the user, etc. For example, according to some aspects, method 400 may include determining whether a metric associated with the user has been established with the authentication server for a predetermined time period, as illustrated in step 402. As discussed herein, authentication server 142 may determine if a metric (e.g., user phone number) has been on file for over a predetermined period of time (e.g., on month). Based on this eligibility criterion, a user may not be eligible for expedited authentication if the user has not met the eligibility requirement. It can be appreciated that while the examples described herein relate to a phone number metric, other metrics associated with the user and/or the account may also be evaluated, such as user's age, and/or any disbursement pre-settings.

According to some aspects, authentication server 142 may determine that the user is not eligible for the first transaction in response to the metric being associated with the authentication server for a time period less than the predetermined time period (e.g., ten days), as illustrated in step 404. Alternatively, authentication server may determine that the user is eligible for the first transaction in response to the metric being associated with the authentication server for a time period equal to or greater than the predetermined time period (e.g., two months), as illustrated in step 406.

FIG. 5 illustrates a web browser and device binding method as part of an authentication process, according to some embodiments. It can be appreciated that the methodologies of the present disclosure can help expedite current and future transactions. For example, the description of FIGS. 2-4 described herein above illustrates how a user may be authenticated at a checkout operation without requiring a login operation or any type of affiliation with a payment processor entity. This provides for a faster authentication process that requires less input steps by the user at the checkout operation (and does not require any prior user input at merchant 130 or service provider 120 relating to the user's financial information). In other words, a user may perform a check out operation without having ever input user financial information at merchant 130 or service provider 120. Once a user experiences an expedited checkout operation, the user may benefit further from a future operation that requires less steps. It is recognized by the present disclosure that once a user is authenticated, the user may then maintain an authentication status for future transactions. This may occur through a binding operation that may be triggered by the authorization process.

According to some aspects, FIG. 5 illustrates web and device binding methods that provide user convenience by avoiding repetitive authentication and/or logging in when changing apps or moving from website to website, or device to device. According to some aspects, method 500 may include performing a binding operation in response to authorizing the checkout operation associated with the first transaction. The binding operation may include generating a public key and a private key pair, as illustrated in step 502. For example, when authentication server 142 authenticates user 102 and authorizes the transaction, authentication server 142 may generate a public key and a private key pair to be used for future authentications and/or transactions.

According to some aspects, method 500 may further include associating the private key with a user identification (e.g., user email address, phone number, account number, etc.), according to step 504. Method 500 may further include storing the public key in authentication server 142 as shown in step 506. The public key may also be stored at the merchant 130 or service provided 120.

According to some aspects, authentication server 142 may perform a browser binding operation and/or a device binding operation. It can be appreciated that the binding operation performed by authentication server 142 may be scalable whereby a browser is initially bound, then a device, then one or more other devices. According to some aspects, authentication server 142 may perform a web browser binding operation by transmitting the private key to user device 102 and/or merchant 130 for storage in a cookie associated with the web browser. Additionally, or in the alternative, authentication server 142 pay perform a device binding operation. In this regard, authentication server 142 may transmit a token to client device 104 and merchant 130, as illustrated in step 510. According to some aspects, the token may include the private key wherein merchant 130 may associate the private key with the customer identification. It can be appreciated that the public key may be stored with the authentication server to check future digital signatures signed by the private key. In other words, the user can utilize the token during a future transaction. For example, the private key would be used as a reply to a challenge issued by the authentication server 142, merchant 130 or service provider 122. This will allow the user to be further authenticated prior to any future transaction. In other words, the user's device is now trusted. Further, the token can be bound to a specific application (e.g., a web browser) or be application agnostic. Further, a trusteed device now become merchant agnostic, i.e., the user is authorized for transactions at any merchant using the trusted device. According to some aspects, authentication server 142 may process a future transaction associated with the user device by processing the private key in the token as a user signature to the user challenge, and authenticating the device using the stored public key, as illustrated in step 512. Alternatively, merchant 130 or service provider 122 may authenticate the user by processing the token.

Alternatively, or in addition, the private key may transmitted to an entity (e.g., merchant 130 or service provider 120) associated with an authorized transaction as shown in step 508. The private key would then be stored in a cookie by the merchant 130 or service provider 122 and transmitted to the user's web browser. The private key would also be maintained in storage at the authentication server 142, merchant 130 or service provider 122. The contents of the cookie can then be accessed by authentication server 142, the merchant 133 or service provider 122 each time a new transaction is initiated. For example, the cookie can be read via Javascript or passed through a header to be confirmed by the authentication server, 142, merchant 130 or service provider 120. The processes described above binds the private key to a particular application (e.g., a web browser) executing on the user's device or the user device for future transactions. In other words, the local storage of the private key on the user's device means that the application and/or device is now trusted. Thus, future merchant checkouts using that application or that device do not require customer authentication as the private key is used to sign a challenge that is then verified by the public key at the merchant 130 or service provider 120, for example.

Furthermore, if the user has an established account with the merchant 130, and has been previously authenticated, then should the user login to their account from another device, the token—that includes, e.g., a private key—can be extended to that device and that device then becomes trusted. Alternatively, or in addition, the a cookie can be transmitted to the new device to bind the web browser, a specific application and/or device. Finally, data collected from the user device or multiple user devices can also provide additional data to help secure future transactions. For example, risk data may be collected that indicates whether the phone number associated with a device has changed, or the complement of applications that were installed on the device have changed, or multiple applications were uninstalled and then re-installed again. The risk data might indicate that the trustworthiness of the device has been compromised.

Figure 6:
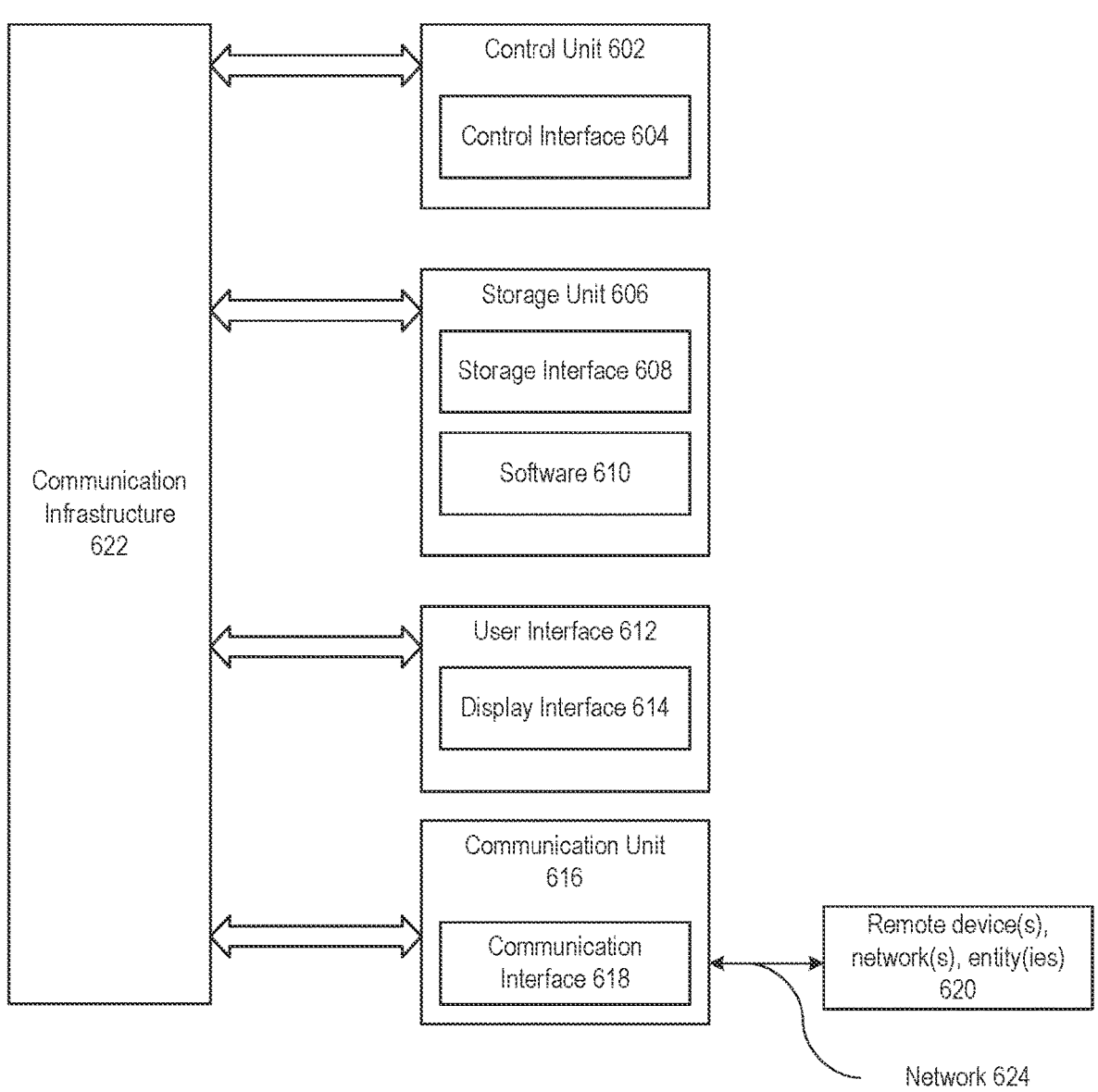
FIG. 6 illustrates a computer system that carries out the binding operations and payment processing, according to some embodiments.

FIG. 6 illustrates a computer system that carries out the binding operations and payment processing methods, according to some embodiments. Various embodiments of the disclosure may be implemented, for example, using one or more well-known computer systems, such as computer system 600 shown in FIG. 6. One or more computer systems 600 may be used, for example, to implement any of the embodiments discussed herein, as well as combinations and sub-combinations thereof.

Computer system 600 may include one or more processors (also called central processing units, or CPUs), such as a processor 604. Processor 604 may be connected to a communication infrastructure or bus 606.

Computer system 600 may also include user input/output device(s) 603, such as monitors, keyboards, pointing devices, etc., which may communicate with communication infrastructure 606 through user input/output interface(s) 602.

One or more of processors 604 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 600 may also include a main or primary memory 608, such as random-access memory (RAM). Main memory 608 may include one or more levels of cache. Main memory 608 may have stored therein control logic (i.e., computer software) and/or data.

Computer system 600 may also include one or more secondary storage devices or memory 610. Secondary memory 610 may include, for example, a hard disk drive 612 and/or a removable storage device or drive 614. Removable storage drive 614 may be a floppy disk drive, a magnetic tape drive, a compact disk drive, an optical storage device, tape backup device, and/or any other storage device/drive.

Removable storage drive 614 may interact with a removable storage unit 618. Removable storage unit 618 may include a computer usable or readable storage device having stored thereon computer software (control logic) and/or data. Removable storage unit 618 may be a floppy disk, magnetic tape, compact disk, DVD, optical storage disk, and/any other computer data storage device. Removable storage drive 614 may read from and/or write to removable storage unit 618.

Secondary memory 610 may include other means, devices, components, instrumentalities or other approaches for allowing computer programs and/or other instructions and/or data to be accessed by computer system 600. Such means, devices, components, instrumentalities or other approaches may include, for example, a removable storage unit 622 and an interface 620. Examples of the removable storage unit 622 and the interface 620 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 600 may further include a communication or network interface 664. Communication interface 624 may enable computer system 600 to communicate and interact with any combination of external devices, external networks, external entities, etc. (individually and collectively referenced by reference number 628). For example, communication interface 624 may allow computer system 600 to communicate with external or remote devices 628 over communications path 626, which may be wired and/or wireless (or a combination thereof), and which may include any combination of LANs, WANs, the Internet, etc. Control logic and/or data may be transmitted to and from computer system 600 via communication path 626.

Computer system 600 may also be any of a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof.

Computer system 600 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 600 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 600, main memory 608, secondary memory 610, and removable storage units 618 and 622, as well as tangible articles of manufacture embodying any combination of the foregoing. Such control logic, when executed by one or more data processing devices (such as computer system 600), may cause such data processing devices to operate as described herein. For example, the instructions, when executed by one or more processors, cause the processors to perform a method for managing third party applications on a computing apparatus as described herein.

Based on the teachings contained in this disclosure, it will be apparent to persons skilled in the relevant art(s) how to make and use embodiments of this disclosure using data processing devices, computer systems and/or computer architectures other than that shown in FIG. 6. In particular, embodiments can operate with software, hardware, and/or operating system embodiments other than those described herein.

Descriptions to an embodiment contemplate various combinations, components and sub-components. However, it will be understood that other combinations of the components and sub-components may be possible while still accomplishing the various aims of the present application. As such, the described embodiments are merely examples, of which there may be additional examples falling within the same scope of the disclosure.

What is claimed is:

1. An authentication server comprising: a non-transitory memory; and one or more processors communicatively coupled to the non-transitory memory and configured to read instructions from the non-transitory memory to cause the authentication server to perform operations comprising:

receiving a user credential associated with a user initiating a transaction on a user device via a first merchant website using a web browser;

performing a matching operation between the user credential and a stored user credential;

in response to the matching operation detecting a match between the received user credential and the stored user credential, performing a user eligibility operation associated with the transaction;

in response to the user eligibility operation determining that the user is eligible for the transaction, generating an authentication challenge for the user;

in response to receiving an indication that the user successfully completed the authentication challenge, retrieving a payment credential of the user;

authorizing a first checkout operation associated with the transaction at the first merchant website;

binding the user credential to the web browser based on authorizing the first checkout operation at the first merchant website, wherein the binding comprises:

generating a public key and a private key associated with the user credential, storing the public key in the non-transitory memory, transmitting the private key to the web browser, wherein the private key is stored in a cookie of the web browser responsive to the transmitting;

receiving a digital signature signed by the private key, the digital signature corresponding to a second checkout operation at a second merchant website on the web browser; and authorizing the second checkout operation without requiring the user to re-enter the user credential or sensitive payment information by checking the digital signature signed by the private key using the public key.

2. The authentication server of claim 1, wherein the user credential is hashed and includes personal identification information (PII).

3. The authentication server of claim 1, wherein the payment credential is associated with a payment processor entity.

4. The authentication server of claim 1, further comprising transmitting the retrieved payment credential to a third party entity for storage.

5. The authentication server of claim 1, wherein the user eligibility operation includes:

determining whether a metric associated with the user has been established with the authentication server for a time period equal to or greater than a predetermined time period.

6. The authentication server of claim 1, wherein the authentication challenge operation is a one-time code sent with an SMS text to the user's device (SMS-OTP operation).

7. The authentication server of claim 1, wherein the one or more processors are further configured to provide the user credential and a virtual card number (VCN) to a third party entity for storage as a card on file for future card not present (CNP) transactions in response the user successfully completing the authentication challenge.

8. The authentication server of claim 1, wherein the binding operation further comprises:

transmitting a token including the private key to the user device and an entity associated with the transaction.

9. A user device comprising:

a non-transitory memory; and one or more processors communicatively coupled to the non-transitory memory and configured to read instructions from the non-transitory memory to cause the user device to perform checkout operations comprising:

requesting a user credential from a user initiating a first transaction on the user device via a first merchant website using a web browser;

transmitting a received user credential to a third party entity to perform a hashing operation of the user credential, wherein a hashed user credential is transmitted to an authentication server, the authentication server being configured to perform a matching operation between the received hashed user credential and a stored hashed user credential stored at the authentication server;

receiving an authentication challenge from the authentication server, the authentication challenge being received in response to the authentication server detecting a match between the received hashed user credential and the stored hashed user credential;

performing a user eligibility operation associated with the first transaction and determining that the user is eligible for the first transaction;

transmitting a user response to the authentication challenge to the authentication server; and receiving a first authorization at the first merchant website from the authentication server, the first authorization including binding credentials bound to the web browser, the binding credentials comprising a private key associated with the hashed user credential corresponding to a public key stored at the authentication server;

storing the private key in a cookie of the web browser;

transmitting a digital signature signed by the stored private key responsive to a user initiating a second transaction on the user device via a second merchant website on the web browser; and receiving a second authorization for the second transaction that is based on checking the digital signature signed by the private key using the public key from the authentication server, the second authorization not requiring the user to re-enter the user credential or sensitive payment information.

10. The user device of claim 9, wherein the user credential includes personal identification information (PII).

11. The user device of claim 9, wherein the third party entity is a payment processor entity.

12. The user device of claim 9, wherein the received binding credentials are stored at the third party entity or at the user device.

13. The user device of claim 9, wherein the authentication challenge operation is a one-time password sent with an SMS text to the user's device.

14. The user device of claim 9, wherein, in addition to receiving the first authorization, the one or more processors are further configured to receive, from the authentication server, a token including the private key, the token being used to authenticate the user device in future transactions by processing the private key in the token as a user signature to the user challenge from the authentication server.

15. A non-transitory computer readable medium including instructions that, when executed by one or more processors of an authentication server, cause the one or more processors to perform authentication operations in response to a user initiating a first transaction through the authentication server on a user device via a first merchant website using a web browser, the authentication operations comprising:

receiving a hashed user credential from a third party entity;

performing a matching operation between the received hashed user credential and a stored hashed user credential;

in response to the matching operation detecting a match between the received hashed user credential and the stored hashed user credential, performing a user eligibility operation associated with the first transaction;

in response to the user eligibility operation determining that the user is eligible for the first transaction, generating an authentication challenge to the user;

in response to receiving an indication that the user successfully completed the authentication challenge, retrieving a payment credential of the user and authenticating the user;

authorizing a first checkout operation associated with the first transaction at the first merchant website;

binding the hashed user credential to the web browser based on authorizing the first checkout operation at the first merchant website, wherein the binding comprises:

generating a public key and a private key associated with the user credential, storing the public key in a non-transitory memory of the authorization server, transmitting the private key to the web browser, wherein the private key is stored in a cookie of the web browser responsive to the transmitting;

receiving a digital signature signed by the private key, the digital signature corresponding to a second checkout operation at a second merchant website on the web browser; and authorizing the second checkout operation without requiring the user to re-enter the user credential or sensitive payment information by checking the digital signature signed by the private key using the public key.

16. The non-transitory computer readable medium of claim 15, wherein the user eligibility operation includes:

determining whether a metric associated with the user has been established with the authentication server for a predetermined time period;

in response to the metric being associated with the authentication server for a time period equal to or greater than the predetermined time period, determining that the user is eligible for the first transaction; and in response to the metric being associated with the authentication server for a time period less than the predetermined time period, determining that the user is not eligible for the first transaction, or determining whether a different metric associated with the user has been established with the authentication server for a predetermined time period.

17. The non-transitory computer readable medium of claim 15, wherein the authentication challenge operation is a one-time password sent with an SMS text to the user's device.

18. The non-transitory computer readable medium of claim 15, wherein the operations further include:

providing the user credential and a virtual card number (VCN) to the third party entity for storage as a card on file for future card not present (CNP) transactions.

19. The non-transitory computer readable medium of claim 15, wherein the user credential is hashed and includes personal identification information (PII).

20. The non-transitory computer readable medium of claim 15, wherein the payment credential is associated with a payment processor entity.

\* \* \* \* \*